3,324,050
METHOD OF CURING A POLYEPOXIDE WITH BIS-HETEROCYCLIC AROMATIC COMPOUNDS AND RESULTING PRODUCTS
Louis A. Joo, Johnson City, Tenn., and John B. Braunwarth and Charanjit Rai, Crystal Like, Ill., assignors, by mesne assignments, to Union Oil Company of California, Los Angeles, Calif., a corporation of California
No Drawing. Filed Feb. 13, 1963, Ser. No. 258,125
20 Claims. (Cl. 260—2)

This invention relates to a novel class of compositions comprising the reaction product of epoxy resin monomers and certain bis-heterocyclic aromatic curing agents.

This invention is based on the discovery that outstanding curing agents for epoxy resins are provided by compounds of the formula:

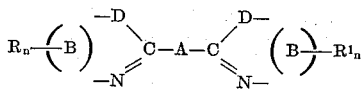

where:

A is a divalent hydrocarbon or hydroxyl-substituted hydrocarbon radical, either of which can contain 1–20 carbon atoms;
B is a polyvalent aromatic mono- or polynuclear hydrocarbon radical, adjacent carbon atoms of which complete a heterocyclic ring with D, C, and N, illustrated by: phenylene,

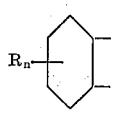

naphthylene,

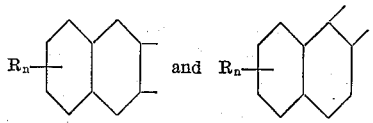

and anthrylene,

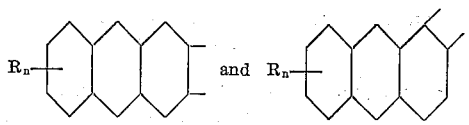

D is sulfur or an NH group;
R and $R^1$ are hydrogen or the same or different hydrocarbon radicals such as alkyl, aryl, or alkaryl, having about 1–20 carbon atoms, and
$n$ is an integer of 1 to 4.

It is an object of this invention to provide a new class of cured epoxy resin compositions. Other objects of the invention will become apparent from the following description.

A sub-genus of compounds coming within the scope of this invention is the bisphenylene-imidazoles and bis-phenylene-imidazolyl-alkanes having the formula:

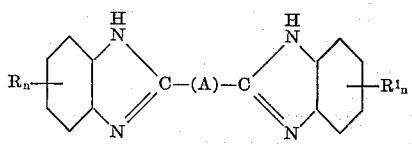

wherein R and $R^1$ are hydrogen atoms or the same or different hydrocarbon radicals having 1–20 carbon atoms, A is a hydrocarbon radical having 1–20 carbon atoms and $n$ is an integer of 1 to 4. Compounds of this sub-group are prepared by reacting dibasic acids or their anhydrides, dinitriles, or diesters with o-phenylene diamines in polyphosphoric acid medium. The reaction proceeds smoothly at 150°–200° C. and is complete in 2 to 3 hours. The reaction mixture is poured onto ice and filtered. The precipitate is washed with water, sodium bicarbonate and water till free from acid. The yield of the product is generally high, varying from 60 to 95%. The bisphenylene-imidazoles thus prepared can be further purified by crystallization from solvents such as ethanol or benzene. These compounds have also been prepared by using 4 N hydrochloride acid instead of polyphosphoric acid, but in this case the reaction time is longer (10 to 12 hours) and generally the yields are poorer.

An example illustrating the preparation is:

Sebacic acid (20.2 g., 0.1 M) and o-phenylene diamine (21.6 g., 0.2 M) were added with stirring to warm polyphosphoric acid (150 cc.) contained in a three-necked flask. The mixture was heated to 200° C. for 3 hours with stirring. It was then cooled and poured onto ice. A greyish precipitate appeared which was filtered and thoroughly washed with water followed by sodium bicarbonate till free of acid. The product was dried in a vacuum desiccator and further purified by crystallization. The yield of 1,8-bis(2-benzimidazolyl)-octane was 88%, M.P. 278° C.

Exemplary species of this sub-genus of compounds are:

1,2-bis(2-benzimidazolyl)-ethane
1,3-bis(2-benzimidazolyl)-propane
1,4-bis(2-benzimidazolyl)-butane
1,5-bis(2-benzimidazolyl)-pentane
1,20-bis(2-benzimidazolyl)-eicosane
1,2-bis(4-isopropylbenzimidazolyl)-ethane
1,3-bis(4-cyclopentylbenzimidazolyl)-propane
1,9-bis(5-sec-butylbenzimidazolyl)-nonane Another sub-genus of compounds coming within the scope of this invention is the bis(benzimidazolyl)-poly hydroxyalkanes of the formula

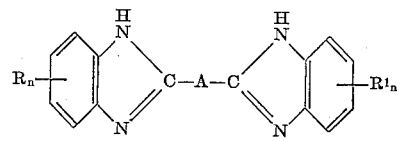

wherein R and $R^1$ are hydrogen or the same or different hydrocarbon radicals having 1–20 carbon atoms, $n$ is an integer of 1 to 4, and A is an alkylene group having one or more, i.e., up to 10 hydroxyl groups.

Exemplary species of this sub-genus of compounds are:

1,3-bis(2-benzimidazolyl)-1,2-dihydroxypropane
1,3-bis(2-benzimidazolyl)-1,2,3-trihydroxypropane
1,5-bis(2-benzimidazolyl)-1,2,3,4,5-pentahydroxypentane
1,3-bis(2-benzimidazolyl)-2-hydroxy propane
1,1-bis(2-benzimidazolyl)-hydroxy methane
1,4-(bis(2-benzimidazolyl)-2-hydroxy butane
1,4-bis(2-benzimidazolyl)-2,3-dihydroxy butane
1,4-bis(2-benzimidazolyl)-1,2-dihydroxy butane This subgroup of curing agents is prepared by reacting about 2 moles of an o-phenylene-diamine with one mole of a hydroxy-substituted dibasic acid, the reaction proceeding with or without the presence of a catalyst such as polyphosphoric acid. The reaction is conducted at temperatures of about 100° to 200° C. The following example is illustrative.

One mole (206 g.) of diethyl tartrate was heated for two hours at 125°–150° C. with two moles (216 g.) of o-phenylenediamine, in the presence of 125 gms. of polyphosphoric acid. The reaction mixture was allowed to cool and was poured into ice water. Then, the product was filtered off, washed with a 5% solution of sodium bicarbonate, followed by water and recrystallized from ethanol. There was a nearly quantitative yield of 1,2-bis(2-benzimidazolyl)-1,2-dihydroxyethane.

It will be understood that the polyepoxy monomers with which the curing agents of this invention are used are generally characterized as aromatic or aliphatic. Where the polyepoxy material is aromatic, it is preferred that the curing agent be selected such that, A and/or R and $R^1$ are also aromatic in character, or that R and $R^1$ be alkaryl or hydrogen, or still more preferably that a bicyclic, tricyclic, or tetracyclic aromatic group be substituted in place of the monocyclic phenylene group. By thus increasing the aromaticity of the curing agent, compatibility with aromatic polyepoxy monomers is improved.

Preparation of such highly aromatic materials can be carried out in a manner analogous to the aforedescribed procedure. Obviously, where A is to be aromatic in character, an aromatic dibasic acid can be used as starting material. Similarly, where R and $R^1$ are to be aromatic, an aryl-substituted o-phenylene diamine can be used. Exemplary species are:

1,2-bis(4-phenylbenzimidazolyl)ethane
1,4-bis(4-phenylbenzimidazolyl)benzene
2,4-bis(4-(4-ethylphenyl)benzimidazolyl)toluene
1-3-bis(2-naphthimidazolyl)propane
1-4-bis(2-anthrylimidazolyl)-2,3-dihydroxybutane
1-4-bis(2-anthrylimidazolyl)benzene Where the polyepoxy monomers are aliphatic in character, it is preferred that A and R be aliphatic. B of course should be monocyclic, i.e., a phenylene group.

Another sub-genus of compounds coming within the scope of this invention is the bisphenylenethiazoles having the formula:

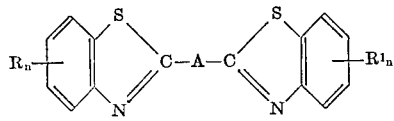

wherein R and $R^1$ are hydrogen or the same or different hydrocarbon radicals having 1–20 carbon atoms, $n$ is an integer of 1 to 4, and A is a hydrocarbon radical or hydroxyl-substituted hydrocarbon radical having 1–20 carbon atoms. These compounds can be prepared by condensing an ortho-aminothiophenol with a dibasic acid in the presence of polyphosphoric acid as catalyst and reaction medium, at a temperature of 100°–200° C., as is described in detail in U.S. patent application Serial No. 151,190. Exemplary species are:

1,3-bis(2-benzothiazolyl)-propane
1,5-bis(2-benzothiazolyl)-pentane
1,9-bis(2-benzothiazolyl)-nonane
1,15-bis(2-benzothiazolyl)-pentadecane
1,20-bis(2-benzothiazolyl)-eicosane
1,2-bis(4-isopropylbenzothiazolyl)-ethane
1,4-bis(4-isopropylbenzothiazolyl)-butane
1,9-bis(4-isopropylbenzothiazolyl)-nonane
1,2-bis(4-cyclopentylbenzothiazolyl)-ethane
1,3-bis(4-phenylbenzothiazolyl)-propane
1,6-bis(4-(ethylphenyl)benzothiazolyl)-hexane
3,5-bis(4-biphenylbenzothiazolyl)-toluene
1,3-bis(2-benzothiazolyl)-2-hydroxyl propane
1-5-bis(2-benzothiazolyl)-2,3,4-trihydroxy pentane
1-4-bis(4-(4-ethylphenyl)benzothiazolyl)2,3-dihydroxyl butane As before stated, where the polyepoxy material employed is aromatic in character, the curing agent preferably will be chosen such that A and/or R and $R^1$ are aromatic. Where the epoxy material is aliphatic, A and R and $R^1$ will preferably be aliphatic.

It will again be understood that bicyclic, tricyclic, and tetracyclic aromatic groups may advantageously be substituted for the phenylene group to increase the aromaticity of the curing agent. Hence, preferred curing agents for aromatic polyepoxy materials are:

1,2-bis(naphthothiazolyl)ethane
1,4-bis(naphthothiazolyl)benzene
1,5-bis(anthrylthiazolyl)pentane
1,2-bis(phenanthrylthiazolyl)ethane
1,4-bis(4-methylnaphthothiazolyl)benzene
1,2-bis(6,7-dimethylnaphthylothiazolyl)ethane
1,8-bis(6,7,8-triethylnaphthothiazolyl)octane
1,2-bis(5,6-dipropylanthrylthiazolyl)ethane
1,4-bis(7-phenylphenanthrylthiazolyl)benzene The epoxy resins or resin intermediates to be cured in accordance with this invention are well known and are widely used as adhesives, encapsulating compounds, laminates, structural forms and the like. The resins, or epoxy intermediates, are cured, in accordance with this invention, by using the curing agents described. Epoxy resins are expensive and are generally extended with other resins such as phenol-formaldehyde resins, aniline-formaldehyde resins, polyester resins, polyvinyl resins, urea-formaldehyde resins, melamine-formaldehyde resins, and the like. These resin extenders as well as the bis compounds of this invention, depending on their properties and the conditions of the reaction, may or may not cross-link with the polyepoxy resin and cause significant changes in the properties.

The polyepoxy-resin intermediate used in preparing extended or undiluted resins in accordance with this invention can be any of the broad class of polyepoxides known to be useful in preparing cured resins. In general, these polyepoxides are straight-chain polymers prepared from low-molecular-weight diepoxides and contain an epoxide group at each end of the chain. The resin intermediates contemplated by this invention are monomers or polymer intermediates having two or more reactive epoxide groups in the intermediate structure, which epoxide groups may be terminal groups.

The epoxy intermediates are available commercially, both in liquid and solid forms (the term intermediates as used herein includes monomers and compositions which are partially polymerized or contain small amounts of polymers), and are polymerized by addition of curing agents which, in the prior art, include primary, secondary, and tertiary amines, and polyfunctional compounds such as glycols, polyglycols, polyamines, polyamides, and carboxylic acid anhydrides. The resins which are prepared by curing epoxy-resin intermediates are cross-linked resins of the thermosetting type, and are characterized by high chemical and thermal stability at high tensile and impact strength. The resins are prepared by addition of a small amount of a curing agent to the epoxy intermediate. The curing agent is added to the epoxy intermediate in an amount which is effective for the particular resin to promote the hardening of the resin. The selection of the particular curing agent is determined by the characteristics of the epoxy resin composition and the proportion of the curing agent may vary widely, although the use of about 5–20% wt. of the curing agent is preferred.

Thermosetting synthetic resins formed by the polymerization of an ethylene oxide derivative containing at least two ethylene oxide groups in the molecule, in the presence of inorganic or organic bases (as described in U.S. Patent 2,444,333), can be used in accordance with this invention. These resinous condensation products are prepared by the reaction between epihalohydrin, for instance epichlorohydrin,

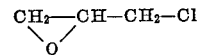

and bis-(4-hydroxyphenyl)dimethylmethane, commonly known as "Bis-phenol A," prepared by the condensation of 2 mols of phenol with 1 mol of acetone and having the formula,

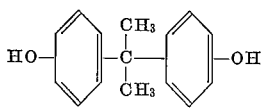

with or without an organic compound present corresponding to the general formula ZCNRNCZ, where R is a divalent organic radical free of functional groups other than the two NCZ groups and Z is a member selected from the class consisting of oxygen and sulfur.

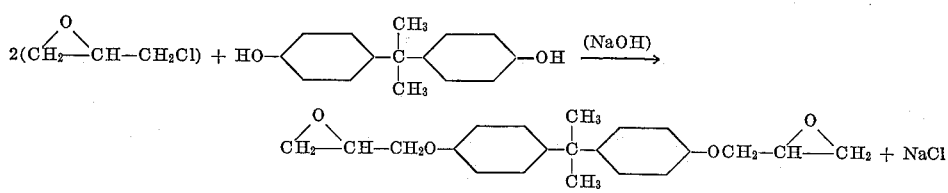

The diphenol product is then reacted with epichlorohydrin in the presence of caustic to yield the diglycidyl ether in accordance with the equation:

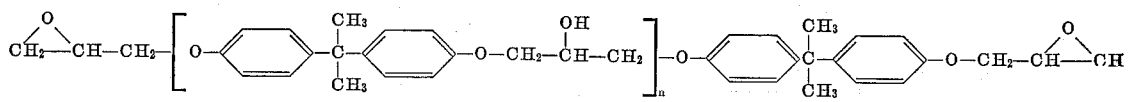

However, when the stoichiometric 2:1 ratio is employed, the yield of the monomeric diglycidyl ether is less than 10%, with the remaining material being higher-molecular-weight condensation and polymerization products. In order to obtain high yields of the monomeric product, excess epichlorohydrin is employed, the stoichiometric amount being doubled or tripled. It is then possible to obtain yields of 70% or more of the monomer.

The epoxy intermediates which are available commercially are generally mixtures containing varying amounts of the true monomer and other higher-molecular-weight condensation and polymerization products. The number of potentially useful reactants for the synthesis of epoxy resins is quite large. All varieties of polyhydric phenols, polyalcohols, polyfunctional halohydrins, and polyepoxides, have been suggested as intermediates in the literature. Many of these epoxy intermediates which can be used in the preparation of epoxy resins are described in such text books as "Epoxy Resins," Skeist, Reinhold Publishing Corporation, 1958 and "Epoxy Resins," Lee and Neville, McGraw-Hill Book Company, 1957. Compounds which are useful intermediates in the preparation of epoxy resins in accordance with this invention include diepoxides, such as butadiene diepoxide and divinylbenzene diepoxide, and diglycidyl ether,

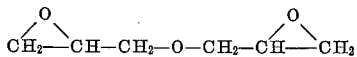

Other diglycidyl ethers include those produced by reaction of epichlorohydrin with other polyhydroxy compounds such as resorcinol, hydroquinone, pyrocatechol, saligenin, phloroglucinol, bisphenol F, trihydroxydiphenoldimethylmethane, fluor-4-dihydroxybiphenol, long-chain bisphenols, 4,4'-dihydroxydiphenol sulfone, novelac resins, ethylene glycol, and higher glycols, glycerol, erythritol, pentaerythritol, etc., in the presence of alkali. Glycidyl esters are also useful intermediates in the preparation of epoxy resin compositions of this invention. Such esters include the diglycidyl ester of diphenolic acid, diglycidyl esters of phthalic acids (all three isomers), and diglycidyl esters of aliphatic dibasic acids, e.g., succinic acid, suberic acid, pimelic acid, etc. In the copending application of Walter E. Kramer and Louis A. Joo, Serial No. 58,638, filed September 27, 1960, the diepoxy esters of 4,4-tetrahydrodipyridyl dicarbamic acid (and analogs thereof), are disclosed as being novel epoxy resin intermediates.

The resinous condensation products thus formed, which are prepared by one method in accordance with U.S. Patent 2,444,333, infra, are known as "Epon" resins which range from solids to viscous liquids having molecular weights in the order of about 1000 to 3000. In one form, this condensation reaction is carried out by employing a ratio of epihalohydrin to the bis-phenol at slightly below or around 2:1. Also, resinous products prepared in accordance with U.S. Patent 2,594,979, can be used.

The structure normally associated with epichlorohydrin bisphenol-A resins, used in accordance with this invention, is:

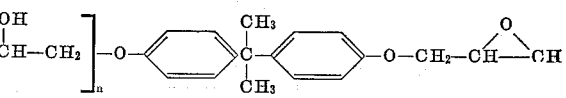

where $n$ has a value of 0 to 10 or more. This invention is directed to the extension or modification, of any resin formed by the reaction of an oxirane ring compound and compounds containing hydroxyl groups, the foregoing disclosure and formulae being illustrative. These resins are formed by the reaction of epichlorohydrin (B.P. 116° C.) or glycerol dichlorohydrin and a large variety of di- or polyhydroxyl compounds. Reactions occur through both the oxirane (epoxy) group and the halogen atom. In place of bisphenol-A such other compounds as glycerol, resorcinol, cresol, various glycols, catechol, hydroquinone, polyhydroxy naphthalenes, novolak-type phenolic resins, and other phenol derivatives may be used, all of which resins come within the scope of this invention.

Thirteen types of EPON (a registered trademark of Shell Chemical Company) resins are known and available for formulation into cured coatings, adhesives, castings and laminates in accordance with this invention. All of these resins possess terminal epoxide groups and are known as epoxy-type resins. The primary difference among the various types of EPON resins is molecular weight, which increases as the identifying number increases. The aliphatic epoxy resins useful herein, (e.g., EPON 812) have a chemical structure of a typical molecule as follows:

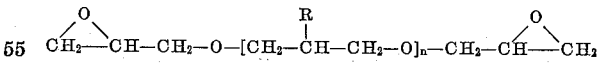

as exemplified by a glycerol-based resin (EPON 812) having a molecular weight of about 300. R in the formula is aliphatic and contains 1–20 carbon atoms.

All of the other members of the "EPON" series are aromatic in character, being obtained from di- and polyhydroxy aromatic compounds such as cresols, polyhydroxy naphthalenes and the like, i.e., R is aromatic or —CH$_2$— is replaced by a phenylene, naphthylene or anthrylene groups in the formula for EPON 812. Other examples are Epoxide 201, a proprietary product of Union Carbide Chemicals Company, identified as 3,4-epoxy-6-methylcyclohexylmethyl - 3,4 - epoxy - 6 - methylcyclohexane carboxylate. Also the product Oxiron 2001, proprietary product of Food Machinery and Chemical Company, having an epoxy equivalent of 145 as described in copending application Serial No. 162,279 may be used.

Table I gives the properties of illustrative poly-epoxy monomers.

TABLE I.—TYPICAL UNCURED EPOXY RESIN SPECIFICATIONS

| Epon Resin Type | Melting Point,[1] °C. | Color,[2] 25° C. (Gardner) | Viscosity,[2] 25° C. Gardner-Holdt | Poises | Epoxide Equivalent[3] |
|---|---|---|---|---|---|
| Epon 812 | Liquid | 3 max | C-F | 0.9-1.5 | 140-160 |
| Epon 815 | Liquid | 5 max | | 5-7 | 175-195 |
| Epon 820 | Liquid | 8 max | | 40-100 | 180-195 |
| Epon 826 | Liquid | 5 max | | 50-100 | 175-190 |
| Epon 828 | Liquid | 5 max | | 100-160 | 180-195 |
| Epon 830 | Liquid | 12 max | | 150-225 | 19-210 |
| Epon 834 | Liquid | 5 max | O-V | 4.1-9.7 | 230-280 |
| Epon 836 | 40-45 | 5 max | A¹-B | 0.3-0.7 | 280-350 |
| Epon 1001 | 65-75 | 4 max | D-G | 1.0-1.7 | 425-550 |
| Epon 1002 | 75-85 | 4 max | G-K | 1.7-3.0 | 550-700 |
| Epon 1004 | 95-105 | 4 max | Q-U | 4.6-6.6 | 875-1,025 |
| Epon 1007 | 125-135 | 5 max | Y-Z₁ | 18-28 | 2,000-2,500 |
| Epon 1009 | 145-155 | 5 max | Z₂-Z₅ | 38-100 | 2,500-4,000 |

[1] Durrans' mercury method.
[2] Epon 812, 815, 820, 826, 828, and 830 on resin as supplied, Epon 834 on 70% wt. solution in butyl Carbitol; all other types on 40% wt. solution in butyl Carbitol at 25° C.
[3] Grams of resin containing one gram-equivalent of epoxide.

The cured epoxy compositions of this invention can be prepared using conventional techniques to prepare resins for use in coating, in electrical applications (potting compounds and insulators) and where adhesion, flexibility, toughness and chemical resistance are required. The cured epoxy compositions of this invention are highly cross-linked and exhibit low toxicity, easy handling, etc. They find use in the manufacture of home appliance finishes, drum and can linings, highly flexible enamels, varnishes exhibiting abrasion resistance, protective linings for tank cars, and industrial adhesives. Also the products may be used to form castings, using metal powder as a filler, for tool and die work and as blending agents with other resins, i.e., with furfural-ketone resins for laminating uses.

In the foregoing description emphasis was placed upon specific bis-compounds within the generic formula which are preferred curing agents. Similarly, the invention was illustrated by the description of specific preferred polyepoxide monomers. It is to be understood, however, that all of the curing agents within the scope of the generic formula will cure all of the polyepoxides known to be useful in preparing cured resins. Obviously, certain bis-compounds and certain polyepoxides, as described, are preferred and will produce superior cured products.

The invention is further illustrated by the following example. Into each of three test-tubes was placed 10 grams of epoxy resin intermediate corresponding generally to the formula:

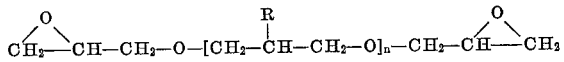

wherein R is an aromatic radical, and $n$ is such as to produce an average molecular weight of about 300, the epoxide equivalent of the monomer being about 185. To each test-tube was added 1 gram of one of the following compounds: 1,5-bisphenylenethiazolyl pentane; 1,2-bisphenylenethiazolyl ethane; and 1,2-bisphenylenimidazolyl-1,2 dihydroxyethane. In each case the mixture displayed a pot life in excess of 80 hours. The three samples were cured for 6 hours at 130°-135° C. to reach in each case a Barcol hardness of 70-75. After 8 additional hours at the same temperature the Barcol hardness of each sample was in the range of 84 to 88.

The embodiments of the invention in which an exclusive property or privilege is claimed are defined as follows:

1. A cured epoxy resin composition containing a polyepoxide having at least two 1,2-epoxy groups per molecule and about 5% to 20% by weight of said polyepoxide of a compound of the formula

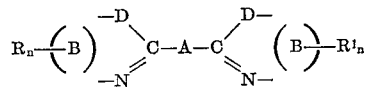

wherein: A is selected from divalent $C_1$–$C_{20}$ alkylene, hydroxy-substituted alkylene, phenylene and methyl-substituted phenylene radicals, B is selected from phenylene, naphthylene, and anthrylene radicals, adjacent carbon atoms of which complete a heterocyclic ring with D, C, and N, D is selected from the group consisting of S and NH, R and $R^1$ are selected from the group consisting of hydrogen and $C_1$–$C_{20}$ alkyl, aryl, alkaryl, and cycloalkyl radicals, and $n$ is an integer in the range of 1 to 4.

2. The method of producing a cured epoxy material comprising mixing together a poly-epoxide having at least two 1,2-epoxy groups per molecule and 5% to 20% by weight of said polyepoxide of a compound of the formula

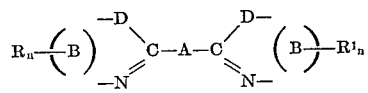

wherein: A is selected from divalent $C_1$–$C_{20}$ alkylene, hydroxy-substituted alkylene, phenylene and methyl-substituted phenylene radicals, B is selected from phenylene, naphthylene and anthrylene radicals, adjacent carbon atoms of which complete a heterocyclic ring with D, C, and N, D is selected from the group consisting of S and NH, R and $R^1$ are selected from the group consisting of hydrogen and $C_1$–$C_{20}$ alkyl, aryl, alkaryl, and cycloalkyl radicals, and $n$ is an integer in the range of 1 to 4, for a time sufficient to cause the hardening of the polyepoxide.

3. A composition in accordance with claim 1 in which D is sulfur and A is selected from $C_1$–$C_{20}$ alkylene and phenylene radicals.

4. A composition in accordance with claim 3 in which B is a phenylene radical.

5. A composition in accordance with claim 4 in which R and $R^1$ are hydrogen.

6. A composition in accordance with claim 3 in which B is selected from naphthylene and anthrylene radicals.

7. A composition in accordance with claim 1 in which D is NH and A is selected from $C_1$–$C_{20}$ alkylene and phenylene radicals.

8. A composition in accordance with claim 7 in which B is a phenylene radical.

9. A composition in accordance with claim 8 in which said polyepoxide is obtained from di- and polyhydroxy aromatic compounds, B is selected from naphthylene and anthrylene radicals, and R and $R^1$ are hydrogen.

10. A composition in accordance with claim 9 in which A is a phenylene radical.

11. A composition in accordance with claim 10 in which said polyepoxide is an aliphatic epoxy resin, B is a phenylene radical and A is a $C_1$–$C_{20}$ alkylene radical.

12. A composition in accordance with claim 11 in which R and $R^1$ are $C_1$–$C_{20}$ alkyl radicals.

13. The method in accordance with claim 2 in which D is sulfur and A is selected from $C_1$–$C_{20}$ alkylene and phenylene radicals.

14. The method in accordance with claim 13 in which B is a phenylene radical.

15. The method in accordance with claim 14 in which R and $R^1$ are hydrogen.

16. The method in accordance with claim 2 in which D is NH and A is selected from $C_1$–$C_{20}$ alkylene and phenylene radicals.

17. The method in accordance with claim 16 in which B is a phenylene radical.

18. The method in accordance with claim 17 in which said polyepoxide is obtained from di- and polyhydroxy aromatic compounds, B is selected from naphthylene and anthrylene radicals, and R and $R^1$ are hydrogen.

19. The method in accordance with claim 18 in which A is a phenylene radical.

20. The method in accordance with claim 19 in which said polyepoxide is an aliphatic epoxy resin, B is a phenylene radical and A is a $C_1$–$C_{20}$ alkylene radical.

References Cited

UNITED STATES PATENTS 2,878,233    3/1959    Harrison _____ 260—47

OTHER REFERENCES

Lee et al., "Epoxy Resins," page 15 relied on, McGraw-Hill Book Co. Inc., New York, 1957.

WILLIAM H. SHORT, *Primary Examiner.*

T. D. KERWIN, *Assistant Examiner.*